(12) United States Patent
Edland (10) Patent No.: US 10,914,336 B2
(45) Date of Patent: Feb. 9, 2021

(54) FASTENING CLIP ASSEMBLY

(71) Applicant: Illinois Tool Works Inc., Glenview, IL (US)

(72) Inventor: David W Edland, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/533,896

(22) PCT Filed: Jan. 15, 2016

(86) PCT No.: PCT/US2016/013595
§ 371 (c)(1),
(2) Date: Jun. 7, 2017

(87) PCT Pub. No.: WO2016/118414
PCT Pub. Date: Jul. 28, 2016

(65) Prior Publication Data
US 2017/0307003 A1    Oct. 26, 2017

Related U.S. Application Data

(60) Provisional application No. 62/106,344, filed on Jan. 22, 2015.

(51) Int. Cl.
*F16B 21/08* (2006.01)
(52) U.S. Cl.
CPC .......... *F16B 21/086* (2013.01); *F16B 21/082* (2013.01)
(58) Field of Classification Search
CPC .................................................. F16B 21/086

USPC ......................................................... 411/508
See application file for complete search history.

(56) References Cited

U.S. PATENT DOCUMENTS

| 3,093,874 | A | * | 6/1963 | Rapata | F16B 12/30 135/119 |
| 3,745,612 | A | * | 7/1973 | Seckerson | F16B 21/086 411/508 |
| 4,318,208 | A | * | 3/1982 | Borja | E05C 19/066 24/305 |
| 4,781,488 | A | * | 11/1988 | Hayashi | H05K 7/142 174/138 D |
| 5,191,513 | A | * | 3/1993 | Sugiura | H05K 7/142 174/138 D |
| D380,667 | S | * | 7/1997 | Kanamori | D8/382 |

(Continued)

FOREIGN PATENT DOCUMENTS

| AU | 71677/74 | 1/1976 |
| CN | 103748369 | 4/2014 |
| GB | 144927 | 3/1969 |

OTHER PUBLICATIONS

International Search Report and Written Opinion for PPCT/US2016/013595.

*Primary Examiner* — Flemming Saether
(74) *Attorney, Agent, or Firm* — Quarles & Brady LLP (57) ABSTRACT

A fastening clip assembly is configured to securely connect to a component, and may include at least one engagement member that is configured to securely engage a portion of the component. The engagement member(s) may include an angle-compensating surface that is configured to allow the fastening clip assembly to securely connect to the component over a range of angles.

12 Claims, 4 Drawing Sheets

(56) References Cited

U.S. PATENT DOCUMENTS

| | | | | |
|---|---|---|---|---|
| 5,897,278 | A * | 4/1999 | Frattarola | F16B 21/02 411/350 |
| 6,478,519 | B1 * | 11/2002 | Genick, II | F16B 5/0258 411/353 |
| 7,019,215 | B2 * | 3/2006 | Arai | F16B 21/086 174/135 |
| 7,186,068 | B2 * | 3/2007 | Zoubek | F16B 21/086 411/510 |
| 8,037,582 | B2 | 10/2011 | Okada | |
| 8,721,246 | B2 * | 5/2014 | Hirakawa | F16B 21/086 411/508 |
| 9,145,909 | B2 | 9/2015 | Lepper | |
| 9,593,701 | B2 * | 3/2017 | Cooley | F16B 21/086 |
| 2003/0159256 | A1 | 8/2003 | Clarke | |
| 2004/0238203 | A1 | 12/2004 | Arai | |
| 2007/0172336 | A1 * | 7/2007 | Hsu | F16B 5/065 411/508 |
| 2008/0066266 | A1 * | 3/2008 | Scroggie | B60R 13/0206 24/297 |
| 2009/0060681 | A1 * | 3/2009 | Nakanishi | F16B 21/086 411/509 |

\* cited by examiner

FASTENING CLIP ASSEMBLY

RELATED APPLICATIONS

This application relates to and claims priority benefits from U.S. Provisional Patent Application No. 62/106,344 entitled "Fastening Clip Assembly," filed Jan. 22, 2015, which is hereby incorporated by reference in its entirety.

FIELD OF EMBODIMENTS OF THE DISCLOSURE

Embodiments of the present disclosure generally relate to fastening clip assemblies.

BACKGROUND

Various assemblies include panels or objects connected to one another. As an example, automobile assemblies include various panels and structures connected to other panels or structures, or to the automobile frame itself. In particular, snap-fit assemblies may be used to connect the pieces together. Additionally, a fastener may be preassembled with one of the components or panels, while the second component or panel is connected to the preassembly during final assembly. A plurality of the fasteners may be used when connecting relatively large components together. Such fasteners have been provided in a variety of shapes and configurations suitable for the particular components to be connected.

One type of fastener used to connect components together is a symmetrical connector having an insertion portion with a W-shape. W-shape fasteners provide quick and easy assembly. Additionally, the W-shape fasteners securely retain moldings of structural panels, while also being relatively easy to remove.

Current retention features on W-base style clips or fasteners are intended to be installed normal to a primary hole formed in a structure. If the clip is not installed normal to the hole, the retention feature typically does not engage the panel properly, resulting in an angled engagement between the clip and the panel. For example, at least one of the engagement members, such as wings, arms, or legs, may be stuck within a hole of a panel due to interference between one or more of the engagement members and the panel. The angled engagement decreases the effective panel range of the clip, forcing an installer to push the clip down farther in order to properly engage the clip. Generally, an individual uses increased force to overcome the interference in order to allow the engagement members to deflect outwardly through the hole.

A known fastener clip is shown and described in U.S. Patent Application No. 62/106,344. When the known fastener clip is installed normal to a panel, the fastener clip may securely connect to a panel such that opposed engagement members may be inserted through the hole of the panel and outwardly deflect to a securing position. The engagement members are aligned with the hole of the panel and are able to pass into the hole (which compresses the engagement members together as the engagement members pass therethrough). However, when the known fastener clip is installed at an angle relative to the panel, a portion of one of the engagement members snags or otherwise interferes with the panel, and does not abut against the panel unless an individual pushes the fastener clip farther down into the hole.

Typical back angles (also referred to as retention angles) of engagement members (such as wings, arms, legs, or the like) of clips are typically curved around a center axis and have a flat plane. Such typical back angles do not compensate for clips installed at angles. When the clip is installed at an angle, the effective panel range decreases, forcing the operator to push the clip harder, or further down, to get the legs to engage.

SUMMARY OF EMBODIMENTS OF THE DISCLOSURE

A need exists for a fastener clip assembly that is configured to accommodate various installation angles. A need exists for a fastener clip assembly that is configured to be installed quickly and easily, even when the fastener clip assembly is angled with respect to a component, such as a panel.

With those needs in mind, certain embodiments of the present disclosure provide a fastening clip assembly that is configured to securely connect to at least one component. The fastening clip assembly may include at least one engagement member that is configured to securely engage a portion of the component(s). The engagement member(s) includes an angle-compensating surface that is configured to allow the fastening clip assembly to securely connect to the component(s) over a range of angles.

The angle-compensating surface may be or include a convex surface. In at least one embodiment, the angle-compensating surface includes tapered lateral edges that connect to a rounded middle section. The rounded middle section extends a greater distance (for example, is taller) than the tapered lateral edges. The angle-compensating surface may include a rounded middle section and recessed portions at lateral edges. The recessed portions include less material than the rounded middle section.

In at least one embodiment, two opposed engagement members connect to a central beam proximate to a beveled lead-in nose.

The engagement member(s) may directly connect to an upwardly extending tab.

In at least one embodiment, the angle-compensating surface is angled with respect to a central longitudinal axis of the fastening clip assembly.

Certain embodiments of the present disclosure provide a system that may include a panel having an opening defined by an internal edge, and a fastening clip assembly having at least a portion positioned through the opening and secured to the panel. The fastening clip assembly may include at least one engagement member that securely engages a portion of the panel. The engagement member(s) may include an angle-compensating surface that allows the fastening clip assembly to securely connect to the panel over a range of angles.

Certain embodiments of the present disclosure provide a fastening clip assembly that is configured to securely connect to a component. The fastening clip assembly may include two component engagement members that connect to a central beam. Each of the two component engaging members may include a distal end directly connected to the central beam, a component-engaging end that is configured to engage a portion of the component(s), and an angle-compensating surface at the component-engaging end. The angle-compensating surface is configured to allow the fastening clip assembly to securely connect to the component over a range of angles.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a fastening clip assembly that is configured to be securely and easily installed at an angle with respect to a panel. The fastening clip assembly is configured to accommodate a range of angles for secure connection, and does not rely on increased insertion forces or require an individual to use excessive force (for example, force that exceeds the force used to provide a secure connection when the fastening clip assembly is normal to the panel) to push the assembly down farther into a hole of the panel.

Figure 1:
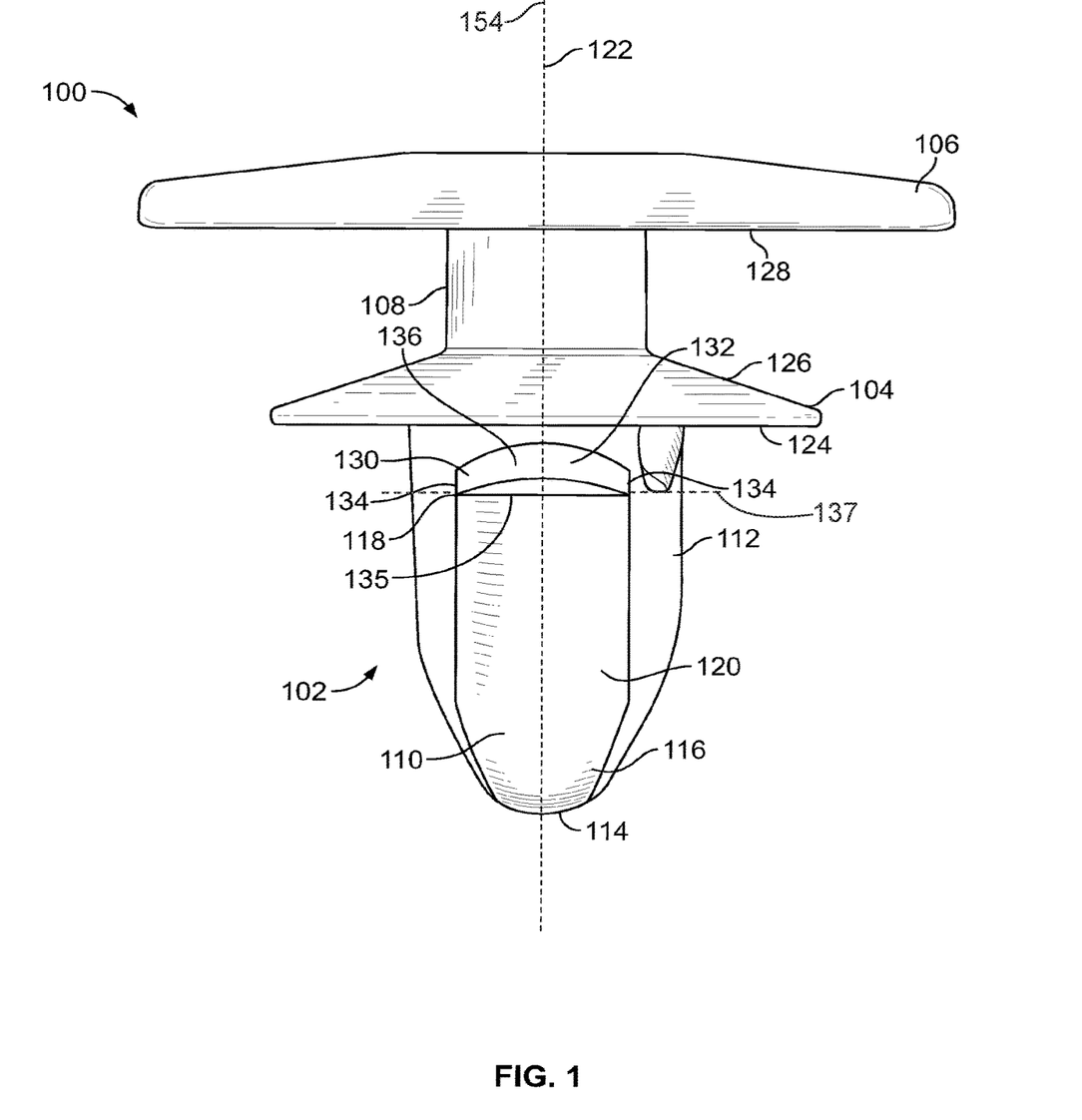
FIG. 1 illustrates a lateral view of a fastening clip assembly, according to an embodiment of the present disclosure.

FIG. 1 illustrates a lateral view of a fastening clip assembly 100, according to an embodiment of the present disclosure. The fastening clip assembly 100 includes a panel-engaging retainer 102 that may be integrally molded and formed with an annular collar 104 having a frustoconical shape, which, in turn, may integrally connect to a cap 106 through a central post 108. The fastening clip assembly 100 may be integrally molded and formed as a single, unitary body. For example, the fastening clip assembly 100 may be integrally molded and formed as a single piece of injection molded plastic.

The panel-engaging retainer 102 may include opposed angled engagement members 110 (only one engagement member 110 is shown in FIG. 1) that connect to a central beam 112 at a beveled lead-in nose 114. Each engagement member 110 may be or include a wing, arm, leg, beam, or other such protuberance that connects to the central beam 112 at a distal end 116. The distal end 116 connects to a component-engaging end 118 through an intermediate extension 120. Each engagement member 110 may further outwardly extend (away from a central longitudinal axis of the fastening clip assembly 100) with increased distance from the distal end 116. That is, each engagement member 110 outwardly flares further apart from the distal end 116 towards the component-engaging end 118.

The opposed engagement members 110 may be spaced 180 degrees from one another. Central longitudinal axes of each of the opposed engagement members 110 and the central beam 112 may be disposed within a common plane 122. During insertion into an opening of a component (such as a panel), the engagement members 110 are configured to inwardly flex toward the central beam 112 as they slide over internal surfaces defining the opening. As the engagement members 110 pass out of the opening, the engagement members 110 outwardly flex back to their at-rest positions. The beveled lead-in nose 114 is configured to guide the panel-engaging retainer 102 into the opening of the component.

A component, such as a panel, is configured to be secured between the component-engaging ends 118 of the engagement members 110 and a lower surface 124 (as oriented in FIG. 1) of the collar 104. In the secured position, an internal edge that defines the opening of the component surrounds the central beam 112. Another component, such as a panel, may be positioned between an upper surface 126 of the collar 104 and a lower surface 128 of the cap 106, such that an internal edge that defines an opening of the additional component may surround the central post 108.

The component-engaging ends 118 of the engagement members 110 may include back angles 130 having angle-compensating surfaces 132, such as convex, tapered, or such recessed surfaces. Accordingly, the fastening clip assembly 100 is configured to accommodate angled installation and does not decrease a panel-engaging range. The engagement members 110 are configured to engage a component and do not require an individual to push the fastening clip assembly farther into an opening of the component. Accordingly, embodiments of the present disclosure provide a robust fastening clip assembly 100 that is not (or is less, as compared to known clips) sensitive to an angle of insertion and may be easily installed.

As shown, the angle-compensating surfaces 132 of the back angles 130 may be convex. The convex angle compensating surfaces 132 may include tapered edges 134 that connect to a rounded middle section 136. The rounded middle section 136 extends from a base 135 (upwardly, as shown in FIG. 1) a greater distance than the tapered edges 134. The base 135 connects to the intermediate extension 120 along a plane 137 that is perpendicular to a central longitudinal axis 154 of the fastening clip assembly 100, the central longitudinal axis 154 being defined by the central beam 112. Each angle-compensating surface 132 may be curved and smoothed with outer lateral edges that are tapered or otherwise recessed in relation to a central portion, such as the rounded middle section 136, for example.

Each engagement member 110 may include component-engaging ends 118 having reduced material (in comparison to known clips) on the back angle 130, thereby allowing the engagement members 110 to engage a component (such as a lower surface of a panel) regardless of an installation angle. In contrast to known fastener clips that have linear back angles and/or back angles of contiguous thickness, the outer lateral edges 134 of the back angles 130 of the fastener clip assembly 100 may be thinned in relation to the central portion (such as the rounded middle section 136), thereby resulting in a convex engagement surface, for example.

Figure 2:
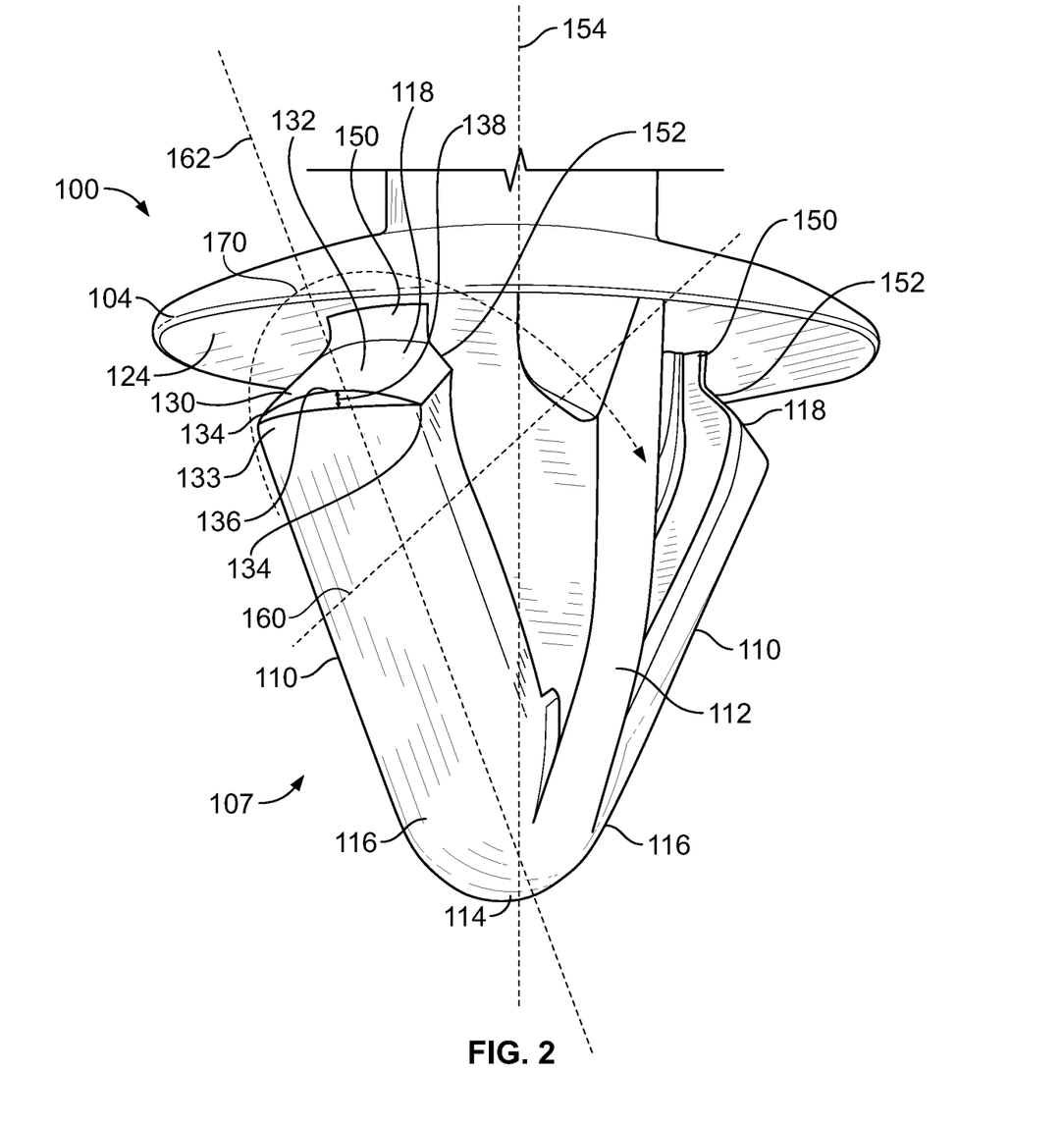
FIG. 2 illustrates a perspective front view of a panel-engaging retainer of a fastening clip assembly, according to an embodiment of the present disclosure.

FIG. 2 illustrates a perspective front view of the panel-engaging retainer 102 of the fastening clip assembly 100, according to an embodiment of the present disclosure. The opposed engagement members 110 converge down toward the lead-in nose 114 and connect thereto proximate to the distal ends 116.

Figure 3:
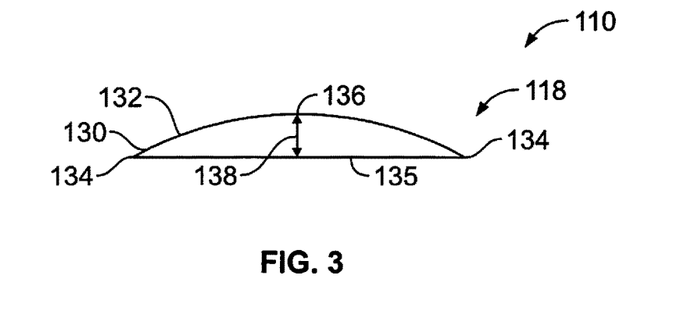
FIG. 3 illustrates an axial cross-sectional view of an angle-compensating surface of an engagement member, according to an embodiment of the present disclosure.

FIG. 3 illustrates an axial cross-sectional view of the angle-compensating surface 132 of the engagement member 110, according to an embodiment of the present disclosure.

Referring to FIGS. 2 and 3, the lateral edges 134 of the angle-compensating surfaces 132 are tapered or otherwise recessed with respect to the rounded middle section 136. The rounded middle section 136 extends a distance 138 from the base 135 that is greater than the extension distance of the lateral edges 134. As shown in FIG. 3, in particular, the rounded middle section 136 is taller than the lateral edges 134. The extension distance of each angle-compensating surface 132 may gradually decrease from the rounded middle section 136 toward each lateral edge 134. The outer surface of the angle-compensation surface 132 may be rounded, blunted, or otherwise smooth. As such, the outer surface of the angle-compensating surface 132 (which is the surface that may be configured to directly contact a portion of a component) may not include any linear edges that could snag on a component.

As shown in FIG. 2, the angle-compensating surfaces 132 may upwardly angle from outer edges 133 toward the surface 124 of the collar 104. For example, longitudinal axes of the angle-compensating surfaces may not be orthogonal or parallel to a central longitudinal axis 154 of the fastening clip assembly 100. As such, each angle-compensating surface 132 may be or include a convex beam that may be angled. Alternatively, the angle-compensating surfaces 132 may be orthogonal to the central longitudinal axis 154.

Each component-engaging end 118 may also include an upwardly-extending tab 150 that extends from an internal edge 152 of the angle-compensating surface 132. The tabs 150 may be substantially parallel to a central longitudinal axis 154 of the fastening clip assembly 100 when the engagement members 110 are in at-rest positions. The tabs 150 may be configured to abut into internal edge portions that define an opening of a component, for example. The tabs 150 may or may not connect to the surface 124 of the collar 104.

Figure 4:
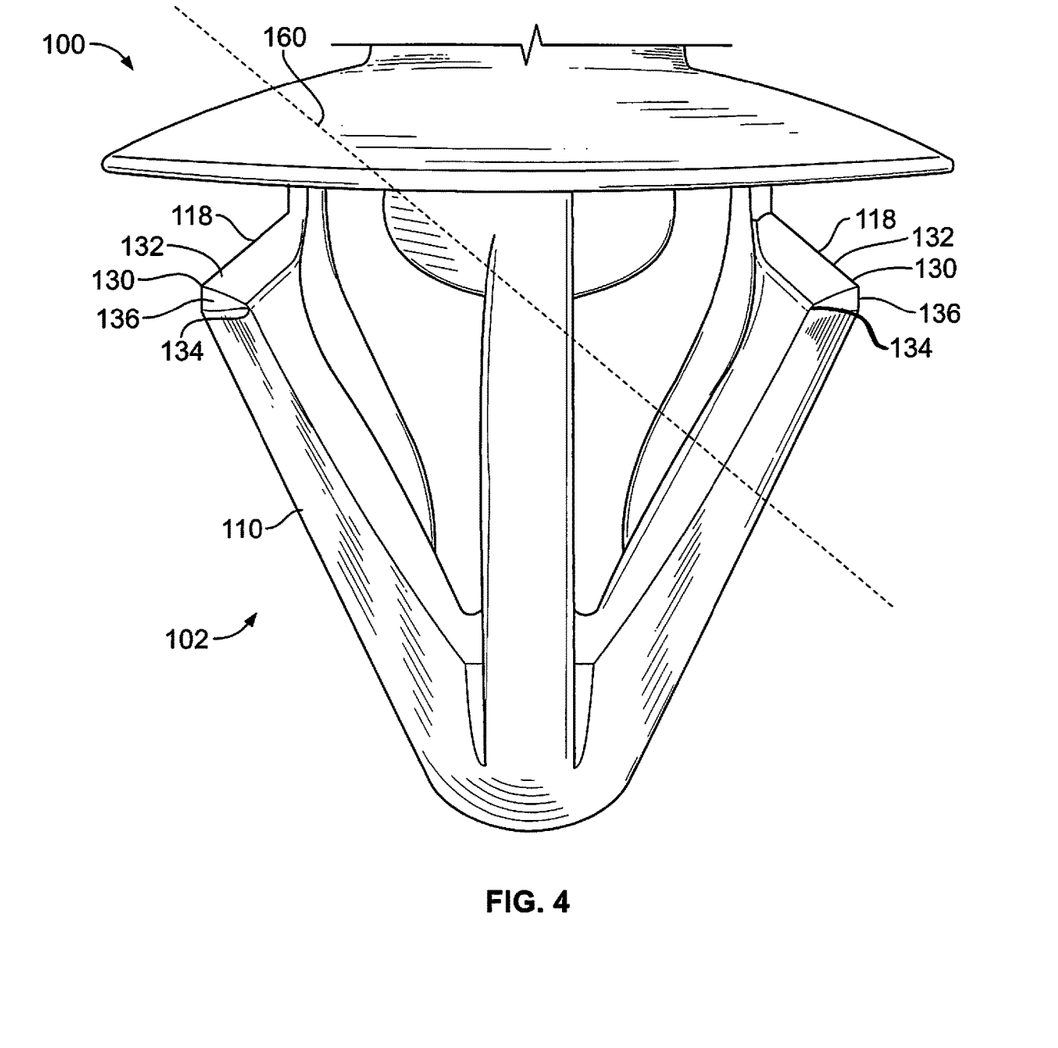
FIG. 4 illustrates a front view of a panel-engaging retainer of a fastening clip assembly, according to an embodiment of the present disclosure.

FIG. 4 illustrates a front view of the panel-engaging retainer 102 of the fastening clip assembly 100, according to an embodiment of the present disclosure. Referring to FIGS. 2-4, in order to form the angle-compensating surfaces 132, a virtual forming rotation axis 160 may be determined. The forming rotation axis 160 may intersect a longitudinal axis 162 of an engagement member 110, such as at a right angle. The forming rotation axis 160 is then used as a reference rotational axis for forming a mold, and/or for use by a forming tool, such as a milling tool. For example, a forming tool may be positioned in relation to the forming rotation axis 160 and rotates about the forming rotation axis 160 over a 180 degree sweep angle 170, such that a forming portion (such as a blade) is positioned on the component-engaging end 118 and forms the angle-compensating surface 132 as the tool rotates over the sweep angle 170. Optionally, the interior chamber of the mold may be shaped in relation to the forming rotation axis 160. As the forming tool rotates from one lateral edge 134 to an opposite lateral edge 134 over the sweep angle 170, the rotation causes the convex surface of the angle-compensating surface 132 to form. As such, the lateral edges 134 are recessed in comparison to the middle section 136. A smooth, convex surface is formed between the opposed lateral edges 134.

Figure 5:
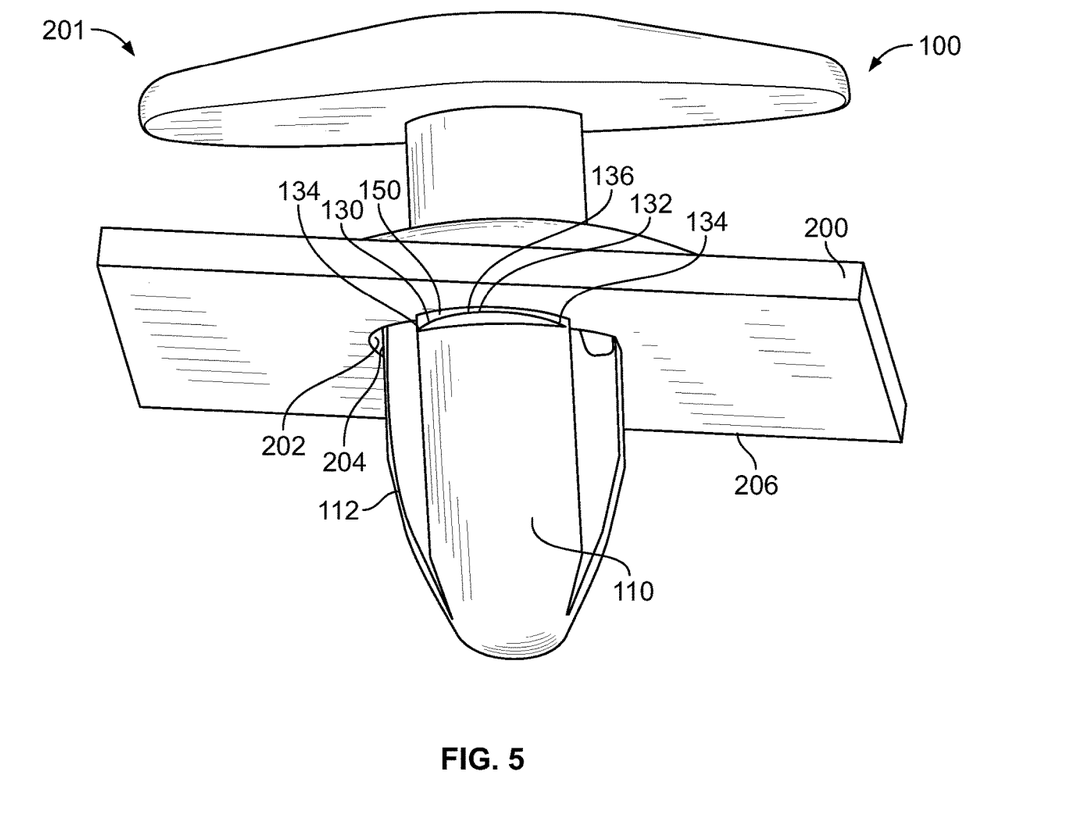
FIG. 5 illustrates a perspective lateral view of a fastening clip assembly secured to a component, according to an embodiment of the present disclosure.

FIG. 5 illustrates a perspective lateral view of the fastening clip assembly 100 secured to a component 200, according to an embodiment of the present disclosure. The fastening clip 100 secured to the component 200 may form a system 201 that securely connects the fastening clip 100 and the component 200 together. The component 200 may be a panel having a round opening 202 defined by internal edges 204. As shown, the engagement members 110 extend below a lower surface 206 of the component 200.

The recessed nature of the tapered lateral edges 134 of the angle-compensating surfaces 132 do not interfere with the internal edges 204. That is, the smooth, curved, tapered edges 134 (which are recessed compared to the rounded middle portion 136) do not snag, hook, latch, or otherwise catch on the internal edges 204 that define the opening. Further, the tapered edges 134 do not hinder secure engagement by undesirably abutting into the lower surface 206 when the component 200 is at an angled (that is, non-normal) orientation with respect to the fastening clip assembly 100. Instead, as shown in FIG. 4, even when the component 200 is angled, the convex shape of the angle-compensating surfaces 132 (with the recessed, tapered lateral edges 134) may allow the tabs 150 to securely abut into the internal edges 204 (in contrast to known clips, in which non-normal orientation causes the engagement members to interfere with the panel, and hinder the tabs from securely engaging against the internal edges). Alternatively, the engagement members 110 may not include the tabs 150. In short, the convex shape of the angle-compensating surfaces 132 of the engagement members 110 eliminates, minimizes, or otherwise reduces a possibility of the engagement members 110 interfering with the component 200 during insertion and installation.

As described above, embodiments of the present disclosure provide a fastener clip assembly that is configured to accommodate various installation angles. Further, embodiments of the present disclosure provide a fastener clip assembly that is configured to be installed quickly and easily, even when the fastener clip assembly is angled with respect to a component.

Embodiments of the present disclosure provide a fastening clip assembly that includes at least one engagement member that is configured to securely engage a portion of at least one component. The one engagement member(s) includes an angle-compensating surface that is configured to allow the fastening clip assembly to securely connect to the component(s) over a range of angles. For example, the range of angles may be between a −5 degree offset with respect to a normal installation angle and a +5 degree offset with respect to the normal installation angle. Optionally, the range of angles may be greater or less than a 10 degree difference between end points. For example, the range of angles may be between a −10 degree offset with respect to the normal installation angle and a +10 degree offset with respect to the normal installation angle.

Embodiments of the present disclosure may be used with various sizes, shapes, and types of fastening clip assemblies. For example, embodiments of the present disclosure may be used with W-shaped connectors having opposed engagement members. Optionally, embodiments of the present disclosure may be used with fastening clip assemblies having more or less than two engagement members.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A fastening clip assembly that is configured to securely connect to at least one component, the fastening clip assembly comprising:
   a collar having a lower surface connected to an upper surface; and
   a panel-engaging retainer connected to and extending from the lower surface of the collar, the panel-engaging retainer including opposed angled engagement members that connect to a central beam at a lead-in nose, the lower surface of the collar and the panel-engaging retainer are configured to securely engage a portion of the at least one component therebetween, wherein the central beam defines a central longitudinal axis,
   wherein each of the opposed angled engagement members comprises an intermediate extension that outwardly flares from the lead-in nose to a base, wherein the base connects to the intermediate extension along a plane that is perpendicular to the central longitudinal axis, the base further connecting to an angle-compensating surface that is configured to allow the fastening clip assembly to securely engage the at least one component over a range of angles, and a tab having an outer surface that connects to the angle-compensating surface, the outer surface linearly extending from the angle-compensating surface toward the collar and being parallel to the central longitudinal axis when the angled engagement member is in an at-rest position,
   wherein the angle-compensating surface extends from the base along a longitudinal axis that is upwardly angled from the intermediate extension toward the collar and inwardly angled from the intermediate extension toward the central beam, wherein the angle-compensating surface comprises lateral edges that connect to a rounded middle section, wherein the rounded middle section extends further toward the collar than the lateral edges, and wherein the fastening clip assembly is formed as a single, unitary body.

2. The fastening clip assembly of claim 1, wherein the collar has a lower surface and an upper surface, the upper surface defining a frustoconical shape.

3. The fastening clip assembly of claim 1, wherein the opposed angled engagement members are configured to inwardly flex toward the central beam.

4. The fastening clip assembly of claim 1, wherein the longitudinal axes of the opposed angled engagement members and the central longitudinal axis of the central beam are disposed within a common plane.

5. The fastening clip assembly of claim 4, wherein the rounded middle section extends from a base that is perpendicular to the common plane.

6. A system comprising:
   a panel having a first side, a second side opposite from the first side, and an opening defined by an internal edge that extends between the first side and the second side; and
   a fastening clip assembly having a portion positioned through the opening and secured to the panel, the fastening clip assembly comprising:
   a collar having a lower surface connected to an upper surface, the upper surface defining a frustoconical shape; and
   a panel-engaging retainer connected to and extending from the lower surface of the collar, the panel-engaging retainer including a central beam and opposed angled engagement members that securely engage a portion of the panel, a portion of the panel being between the collar and the opposed angled engagement, wherein each of the opposed angled engagement members comprises an intermediate extension that extends from the central beam to a base, wherein an angle-compensating surface extends from the base along a longitudinal axis and allows the fastening clip assembly to securely connect to the panel over a range of angles,
   wherein the intermediate extension extends from the angle compensating surface at an angle toward the central beam, wherein the base connects to the intermediate extension along a plane that is perpendicular to a central longitudinal axis defined by the central beam, wherein the angle-compensating surface further comprises lateral edges that connect to a rounded middle section, and wherein the rounded middle section extends further toward the collar than the lateral edges.

7. The system of claim 6, wherein the two opposed angled engagement members connect to the central beam proximate to a beveled lead-in nose.

8. The system of claim 6, wherein the angle-compensating surface is angled with respect to a central longitudinal axis of the fastening clip assembly.

9. The fastening clip assembly of claim 6, wherein the fastening clip assembly is formed as a single, unitary body.

10. The fastening clip assembly of claim 6, wherein the lateral edges connect to and extend from the base.

11. The fastening clip assembly of claim 6, wherein upwardly extending tabs extend from the angle-compensating surfaces toward the collar.

12. A fastening clip assembly that is configured to securely connect to at least one component, the fastening clip assembly comprising:
   a collar having a lower surface connected to an upper surface, the upper surface defining a frustoconical shape; and
   a panel-engaging retainer connected to and extending from the lower surface of the collar, the panel-engaging retainer including two opposed angled component engagement members that connect to a central beam at a lead-in nose, the lower surface of the collar and the panel-engaging retainer are configured to securely engage a portion of the at least one component therebetween, wherein the central beam defines a central longitudinal axis, and wherein each of the two opposed angled component engagement members comprises:

a distal end directly connected to the lead-in nose of the central beam;

an intermediate extension that outwardly extends with increased distance from the distal end, wherein the intermediate extension extends from the distal end to a component-engaging end, the component-engaging end including a base and being configured to engage a portion of the at least one component, and wherein the intermediate extension connects to the base at an edge that is disposed in along a plane perpendicular to the central longitudinal axis of the central beam;

an angle-compensating surface at the component-engaging end, wherein the angle-compensating surface extends along a longitudinal axis that is upwardly angled from the base and the intermediate extension toward the collar and inwardly angled from the base and the intermediate extension toward the central beam so that the angle-compensating surface is angled with respect to the central longitudinal axis, and wherein the angle-compensating surface is configured to allow the fastening clip assembly to securely connect to the component over a range of angles; and an upwardly extending tab that extends from the angle-compensating surface toward the collar, the upwardly extending tab being configured so that it is convex about and parallel to the central longitudinal axis when the corresponding angled component engagement member is in an at-rest position, wherein the angle-compensating surface comprises lateral edges that connect to a rounded middle section, wherein the rounded middle section extends further toward the collar than the lateral edges, wherein the longitudinal axes of the two opposed angled component engagement members and the central longitudinal axis of the central beam are disposed within a common plane, and the two opposed angled component engagement members are configured to inwardly flex from the at-rest position toward the central beam, and wherein an internal edge extends from and connects the lateral edges of the angle-compensating surface to the tab so that the tab is narrower than the angle-compensating surface.

\* \* \* \* \*